US012582261B2

(12) United States Patent  
Quaratesi et al.

(10) Patent No.: US 12,582,261 B2  
(45) Date of Patent: Mar. 24, 2026

(54) DISMANTLABLE DISPENSER FOR A COFFEE MACHINE

(71) Applicant: DE' LONGHI APPLIANCES S.R.L., Treviso (IT)

(72) Inventors: Guido Quaratesi, Treviso (IT); Davide Sgnaolin, Treviso (IT)

(73) Assignee: DE' LONGHI APPLIANCES S.r.l., Treviso (IT)

( * ) Notice: Subject to any disclaimer, the term of this patent is extended or adjusted under 35 U.S.C. 154(b) by 1022 days.

(21) Appl. No.: 17/627,660

(22) PCT Filed: Jun. 17, 2020

(86) PCT No.: PCT/EP2020/066686  
§ 371 (c)(1),  
(2) Date: Jan. 15, 2022

(87) PCT Pub. No.: WO2021/008801  
PCT Pub. Date: Jan. 21, 2021

(65) Prior Publication Data  
US 2022/0313005 A1 Oct. 6, 2022

(30) Foreign Application Priority Data  
Jul. 17, 2019 (IT) ........................ 102019000012189

(51) Int. Cl.  
*A47J 31/46* (2006.01)

(52) U.S. Cl.  
CPC .................................. *A47J 31/467* (2013.01)

(58) Field of Classification Search  
CPC ............................ A47J 31/462; A47J 31/4485  
USPC ....................................................... 222/173  
See application file for complete search history.

(56) References Cited

U.S. PATENT DOCUMENTS 4,532,142 A * 7/1985 Dean ...................... A47J 31/057  
426/433  
11,317,755 B2 * 5/2022 Nabeiro .................. A47J 31/42

FOREIGN PATENT DOCUMENTS

| CN | 103799881 A | 5/2014 | |
|---|---|---|---|
| DE | 102008022220 A1 * | 11/2009 | ............ A47J 31/467 |
| EP | 2189085 A1 * | 5/2010 | .......... A47J 31/4485 |
| EP | 2345354 A1 | 7/2011 | |
| EP | 2721976 A1 * | 4/2014 | ............. A47J 31/46 |
| EP | 3025624 A1 * | 6/2016 | .......... A47J 31/4482 |

(Continued)

OTHER PUBLICATIONS

YouTube video clip entitled "How to Clean the Central Spout of Your Miele Coffee Machine" uploaded on Mar. 2, 2019 by user "Miele USA". Retrieved from Internet: <https://www.youtube.com/watch?v=2dgL1WroqAY> (Year: 2019).*

(Continued)

*Primary Examiner* — Tiffany T Tran  
(74) *Attorney, Agent, or Firm* — Troutman Pepper Locke LLP

(57) ABSTRACT

The coffee machine comprises an infused coffee dispenser comprising a hollow body delimiting at least one dispensing chamber for dispensing infused coffee and having at least one inlet hole for the infused coffee and at least one dispensing hole for dispensing the infused coffee, the hollow body of the infused coffee dispenser being formed into several pieces comprising at least one dismantlable first piece adapted for opening a direct access to the inside of the dispensing chamber.

8 Claims, 4 Drawing Sheets

(56)     References Cited

FOREIGN PATENT DOCUMENTS

| EP | 2732741 A1 | 8/2017 | |
| IT | UB20155134 A1 | 4/2017 | |
| WO | WO-2007129204 A2 * | 11/2007 | .............. F16L 37/58 |

OTHER PUBLICATIONS

International Search Report and Written Opinion issued in corresponding International Application No. PCT/EP2020/066686, mailed Jul. 23, 2020.

* cited by examiner

DISMANTLABLE DISPENSER FOR A COFFEE MACHINE

CROSS-REFERENCE TO RELATED APPLICATIONS

This is a U.S. national phase application under 35 U.S.C. § 371 of International Patent Application No. PCT/EP2020/066686, filed Jun. 17, 2020, and claims benefit of priority to Italian Patent Application No. 102019000012189, filed Jul. 17, 2019. The entire contents of these applications are hereby incorporated by reference.

FIELD OF THE INVENTION

The present invention refers to a coffee machine comprising a machine body, a rest plane of at least a cup, an infuser, a housing supported by the machine body above the rest plane, and a coffee dispenser housed in the housing; this dispenser comprises an inlet hole for the coffee, a hollow body delimiting a dispensing chamber for dispensing coffee, and a hole for dispensing the coffee into a cup.

BACKGROUND

For some time, machines have been present on the market for preparing coffee and/or other generally hot beverages in which the coffee and/or beverage prepared inside the machine body is transferred to the container, generally a cup, of the end user by suitable conduits that convey and dispense the liquid outside the machine body and thus to the cup.

It is known that one of the problems that arise in the use of such machines is cleaning these conduits through which the liquid of the beverage flows, and particularly cleaning of the end dispensers in which residues of the beverage may gather, which detract both from the hygiene and the quality of the subsequently dispensed beverages.

As is known, machines are present on the market for preparing coffee that actuate automatic washing of the conduits and of the dispenser with process fluids of the machine, such as steam or hot water: this washing is also offered by relatively elaborate, complex and costly machines.

Also known are machines for preparing coffee that have dispensers outside the machine body, which are differently associated with the body itself, that is a housing outside the machine body, which can be manually separated for cleaning of the conduits for the transit and dispensing of the liquid of the beverage.

By way of example, EP 22721976 B1 teaches a dismantlable dispenser for a beverage preparing machine, formed by two parts that are associated with one another and by a common support with a snap or clamping connection.

And also EP 2732741 B1 teaches a machine for preparing beverages with a central dispenser removably associated directly or with a housing outside the machine body with connecting means that comprises a hooked element.

Such traditional solutions are notoriously of poor efficacy because dismantling the dispenser from the machine body for subsequent cleaning is particularly complex. These traditional solutions notoriously imply that the elements constituting the dispensers then have a complex shape that for thorough cleaning requires attentive manual operations by the end user.

Lastly, but no less importantly, it is not possible to access the dispensing chamber directly with the fingers of the hands to perform complete cleaning by the user without the help of particular tools.

The need is thus felt to simplify the structure of the coffee dispensers associated with a known machine body, that is a known housing supported by the machine body.

SUMMARY

The technical task that is proposed by the present invention is accordingly to make a coffee dispenser associated with a coffee machine body, that is a housing supported by the coffee machine body that enables the deplored technical drawbacks of the prior art to be eliminated.

In the context of this technical task, one object of the invention is to make a coffee dispenser that is easily accessible and dismantlable from the machine body or from a housing supported by the coffee machine body that permits simple and cheap cleaning of the dispensing zone.

Another object of the invention is to make a coffee dispenser that is dismantlable from the machine body or from a housing supported by the coffee machine body that is dismantlable into just a few elements to perform advantageously cleaning of the innermost parts thereof with manual washing or washing in a dishwasher.

Another object of the invention is to make a coffee dispenser that is dismantlable from the machine body or from a housing supported by the coffee machine body that relates only to the coffee dispensing conduit.

Not the least important object of the invention is to make a coffee dispenser that is dismantlable from the machine body, that is a housing supported by the coffee machine body that in operating conditions is protected from the view and contact of the user.

The technical task, and these and other objects according to the present invention, are attained according to the present invention by making a coffee machine comprising a machine body, a housing supported by said machine body, and an infused coffee dispenser housed in said housing, said infused coffee dispenser comprising a hollow body delimiting at least one dispensing chamber for dispensing infused coffee and having at least one inlet hole for the infused coffee and at least one dispensing hole for dispensing the infused coffee, characterized in that said hollow body of said infused coffee dispenser is formed into several pieces comprising at least one first dismantlable piece adapted for opening direct access inside said dispensing chamber.

Advantageously, removable engagement means of said infused coffee dispenser in said housing is further provided.

Advantageously, said housing is formed into several pieces comprising at least one first dismantlable piece adapted for opening a maneuvering space for engaging and disengaging said infused coffee dispenser from said housing.

The present invention also discloses a method for accessing the dispensing chamber of an infused coffee dispenser housed in a housing supported by a machine body of a coffee machine, characterized in that the following steps are performed in succession: dismantling manually from said housing a first piece of said housing so as to open a maneuvering space for disengaging said infused coffee dispenser from said housing; removing manually said infused coffee dispenser from said housing; and dismantling manually from said loose coffee dispenser a first piece of said loose coffee dispenser so as to access the inside of said dispensing chamber.

Advantageously, owing to the special dismantlable structure thereof, the outer dispenser of infused coffee permits easy access to the inside of the dispensing chamber that can be so opened as to be easily and completely inspectable and washable internally and externally by hand or in a dishwasher.

The first piece of the hollow body is configured in such a manner that, if dismantled, it leaves open sufficient space for introducing the fingers of hands inside the dispensing chamber, whereas if it is assembled it prevents any access from the outside to the dispensing chamber except from through the inlet hole of the infused coffee, the dispensing hole for dispensing the infused coffee, and possibly through an air venting channel, if provided.

In practice, the user, also without using any common or special tool, can in sequence: open manually the housing of the outer dispenser of infused coffee; remove manually the outer dispenser of infused coffee from the infused coffee housing; and open manually the outer dispenser of infused coffee to access the dispensing chamber.

Other characteristics of the present invention are also defined in the following claims.

BRIEF DESCRIPTION OF THE DRAWINGS

Further characteristics and advantages of the invention will become more apparent from the description of a preferred, but not exclusive, embodiment of a coffee machine according to the invention, illustrated by way of indicative and non-limiting example in the accompanying drawings, in which.

DETAILED DESCRIPTION

Figure 1:
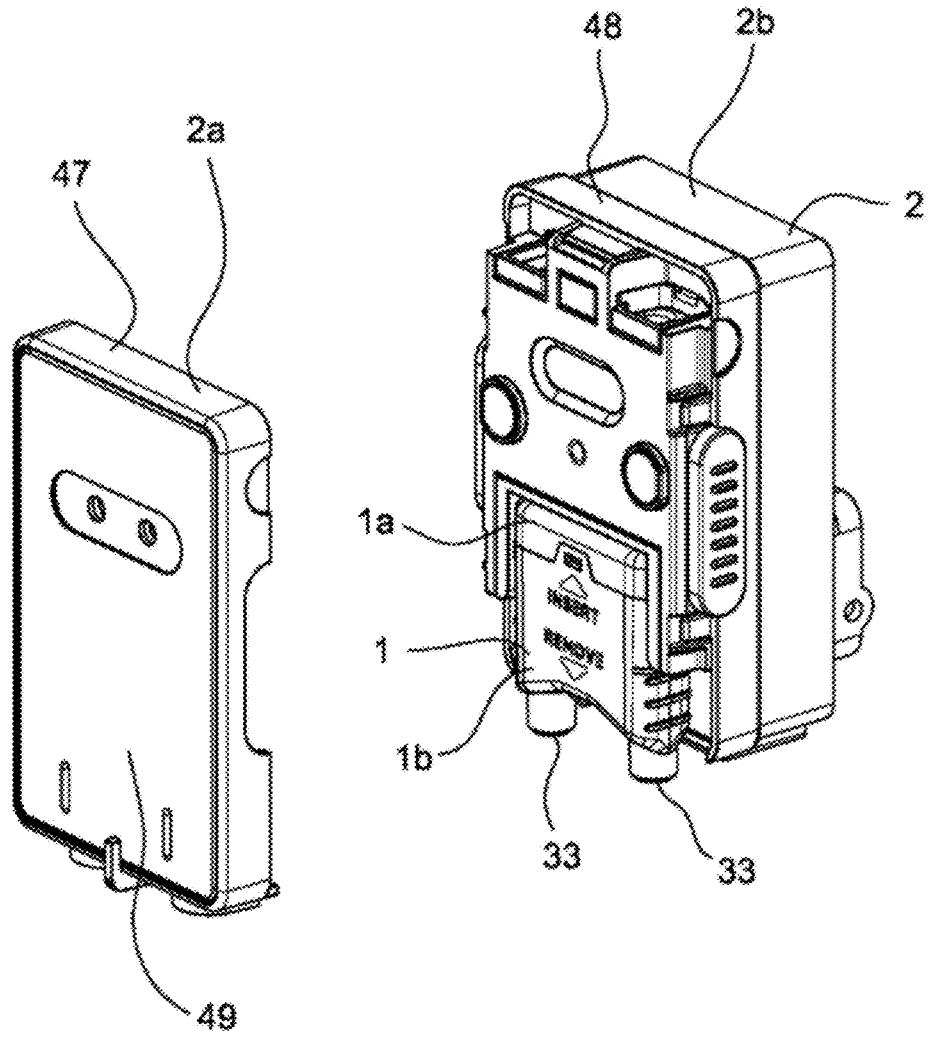
FIG. 1 shows an axonometric view of the open housing and of the dispenser housed in the housing.
Figure 2:
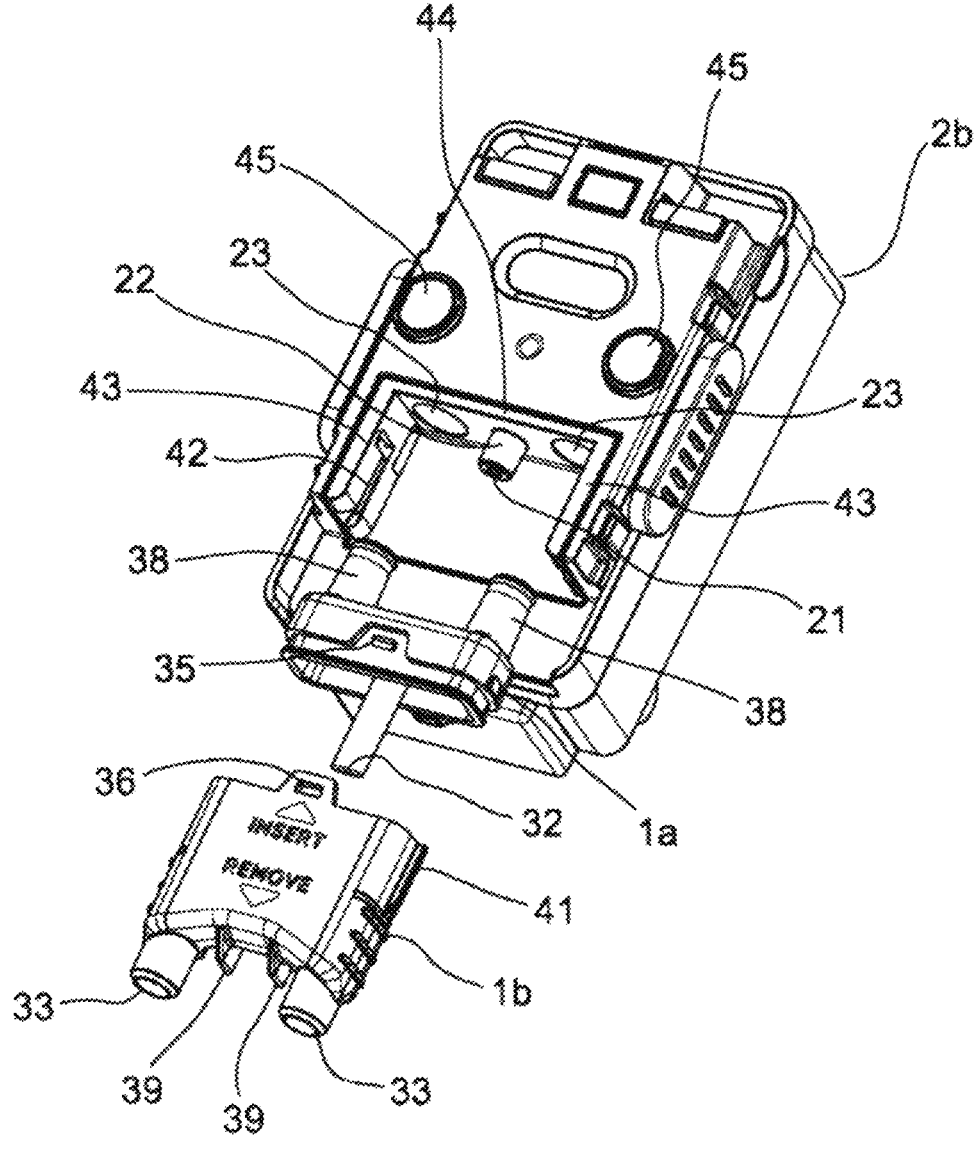
FIG. 2 shows a perspective view of the open housing and of the dispenser separated from the housing and dismantled into the first and second dismantlable piece.
Figure 3B:
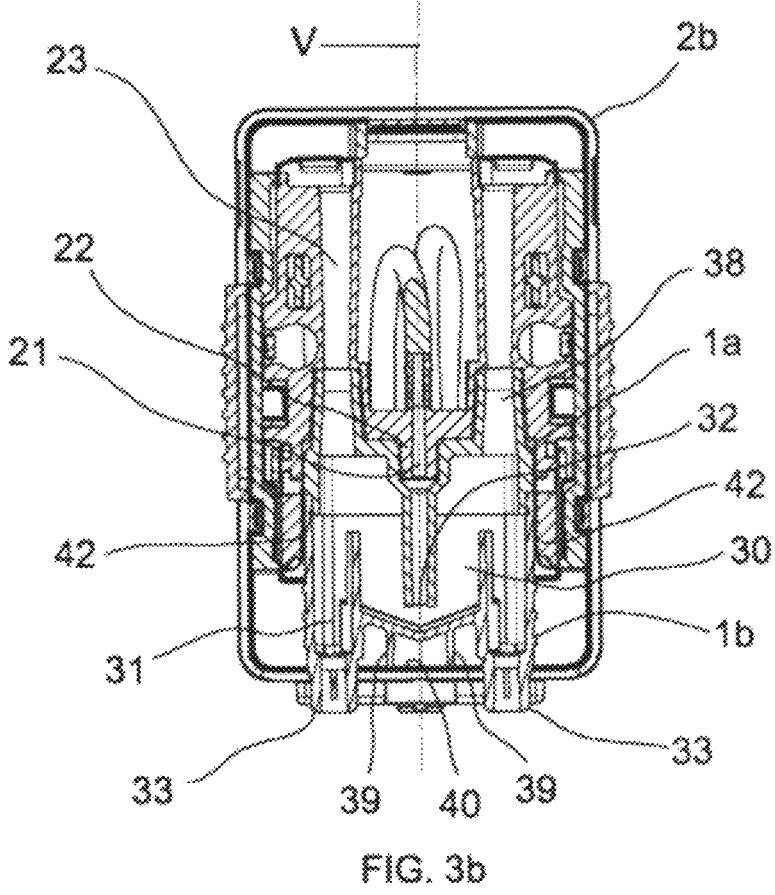
FIG. 3b shows a vertical section according to plane AA of the housing and of the housed dispenser.
Figure 3A:
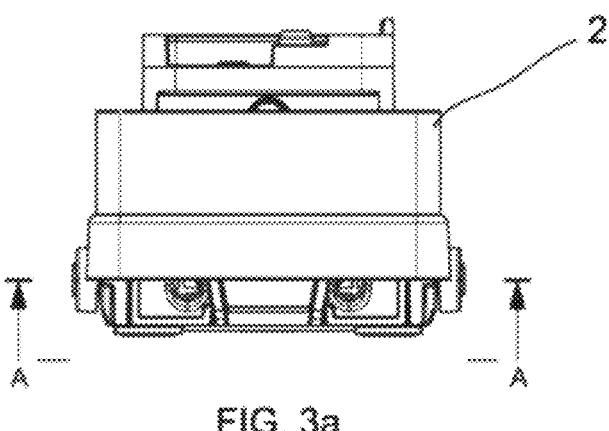
FIG. 3a shows a top view of the housing and of the housed dispenser.
Figure 4:
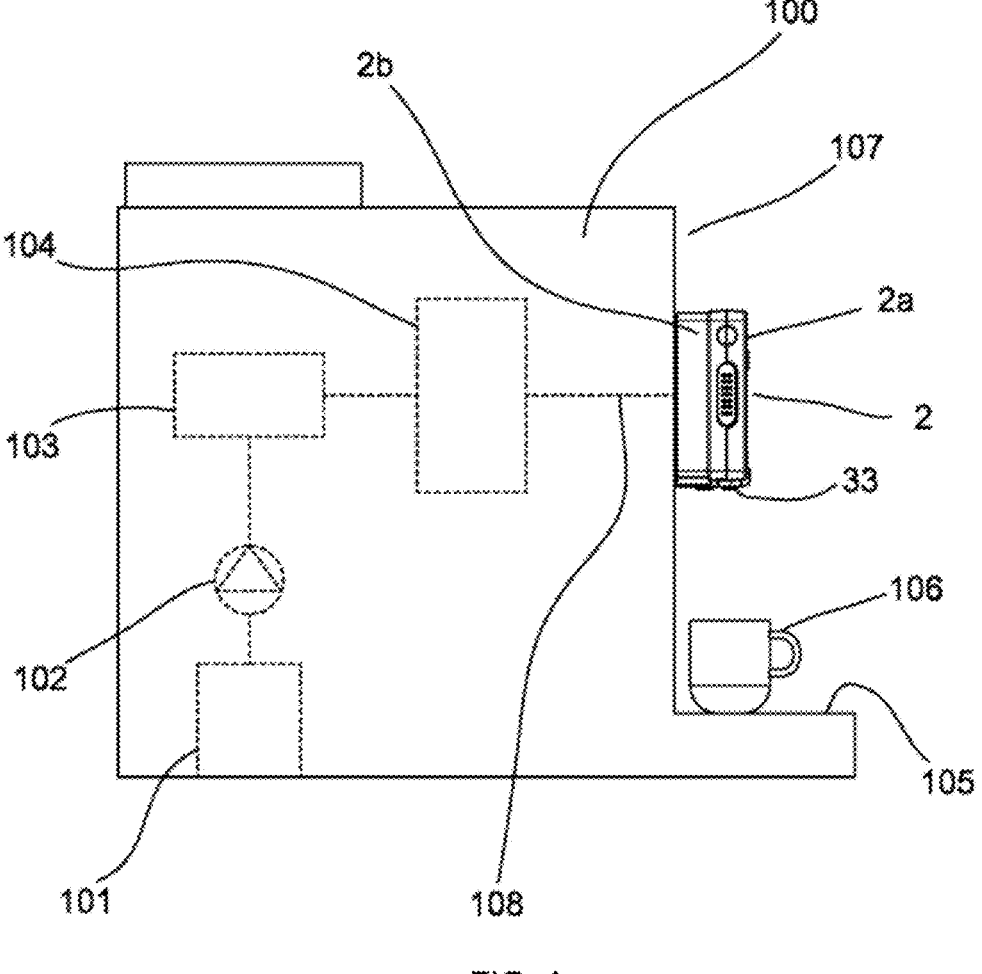
FIG. 4 shows schematically a lateral raised view of a coffee machine body that supports the housing where the dispenser is housed.

With reference to the figures cited, a coffee machine is shown having in a known manner a machine body 100 that supports an infusion circuit comprising in cascade a water source 101, a supply pump 102, a boiler 103, an infuser 104 and an outer dispenser 1 for dispensing infused coffee positioned removably in a housing 2 supported by the machine body 100 above a rest plane 105 for the cups 106.

The infuser 104, in a known manner, provides an infusion chamber that can be opened to load inside the loose or portioned coffee powder and closed to perform infusion with the water supplied by the pump 102 and heated by the boiler 103. The rest plane 105 for the cups 106 and the above outer dispenser of infused coffee 1 are positioned in front of the front wall 107 of the machine body 100.

The housing 2 is supported by the coffee machine body 100 and has at least one fluid connecting line 108 with the exit of the infused coffee from the infuser 104. The infused coffee dispenser 1 comprises a hollow body 1a, 1b delimiting a dispensing chamber 31 for dispensing infused coffee and having at least one inlet hole 32 for the infused coffee, in particular a single hole 32, and at least one dispensing hole 33 for dispensing the infused coffee, in particular two holes 33. Advantageously, the hollow body 1a, 1b of the infused coffee dispenser 1 is formed into several pieces comprising at least one assemblable and dismantlable first piece 1a adapted for closing and opening a direct access to the inside of the dispensing chamber 31.

Advantageously, also the housing 2 is formed into several pieces comprising at least one first assemblable and dismantlable piece 2a adapted for opening a maneuvering space for engaging and disengaging the infused coffee dispenser 1 from the housing 2.

Each dispensing hole 33 for dispensing the infused coffee is vertical for dispensing directly to the cup underneath 106.

The two dispensing holes 33 are spaced in such a manner as to be able to each dispense into a corresponding cup 106 or both into a single cup 106.

In the solution illustrated merely by way of example, the dispenser 1 has a vertical symmetry axis V and has a dispensing chamber 31, a single upper central vertical inlet hole 32 of the infused coffee, two lower lateral vertical dispensing holes 33 of the infused coffee, a storage chamber 30 of the infused coffee and one or more air venting channels 38, in particular two upper lateral vertical air venting channels 38.

The venting channels 38 are more precisely superimposed vertically on the corresponding dispensing holes 33.

Each vertical air venting channel 38 has a shape and force coupling with a corresponding vertical channel 23 that is axially open and communicating with the atmosphere that leads into the horizontal internal walls 44 of the housing 2 where the end-piece 22 of the supply line 108 of the infused coffee is present.

The storage chamber 30 is adapted for receiving the infused coffee from the inlet hole 32 and distributing the infused coffee by the force of gravity to the dispensing chamber 31 from which it exits through the dispensing holes 33 to collect in the cup/s 106 underneath.

The inlet hole 32 is connected to a vertical supply hole 21 of an end-piece 22 of the supply line 108 of the infused coffee that leads inside the housing 2.

In particular, the supply hole 21 is placed above the inlet hole 32 and the two holes 21 and 32 are coaxial and arranged according to the vertical axis V of symmetry of the dispenser 1.

The hollow body 1a, 1b is formed, preferably but not exclusively, by a first upper piece 1a and a second lower piece 1b that movably engage with one another. The first assemblable and dismantlable upper piece 1a of the hollow body 1a, 1b is adapted to closing and opening direct access to the inside of the dispensing chamber 31 and the storage chamber 30 by snap-fitting means to the second lower piece 1b of the hollow body 1a, 1b.

This snap-fitting means preferably comprises at least one coupling tooth 35 provided on the first upper piece 1a of the hollow body 1a, 1b engaged in a snap-fit seat 36 provided on the second piece 1b of the hollow body 1a, 1b, that is the other hand, at least one snap-fit seat provided on the first upper piece 1a of the hollow body 1a, 1b engaged with a coupling tooth provided on the second lower piece 1b of the hollow body 1a, 1b.

In the first upper piece 1a of the hollow body 1a, 1b a closing cap of the dispensing chamber 31 and of the storage chamber 30, the inlet hole 32, and the air venting channels 38 are formed.

In the second lower piece 1b of the hollow body 1a, 1b the bottom and side wall of the dispensing chamber 31 and of the storage chamber 30, and the dispensing holes 33 are formed.

The first upper piece 1a and the second lower piece 1b of the hollow body 1a, 1b are joined along an outer perimeter edge thereof of conjugate shape.

The assembled hollow body 1a, 1b thus delimits a dispensing chamber 31 and a storage chamber 30 that are protected because they are inaccessible from the outside thereof apart from through the inlet hole of the infused coffee 32, the dispensing holes of the infused coffee 33, and the air venting channels 38.

In the most simple configuration of the outer dispenser 1 that does not have a storage chamber or air venting channels, the assembled hollow body 1a, 1b delimits a dispensing chamber 31 that is protected because it is inaccessible from the outside thereof apart from through each inlet hole of the infused coffee 32 provided and each dispensing hole for dispensing the infused coffee 33 provided. The first upper piece 1a and the second lower piece 1b of the hollow body 1a, 1b in a preferred embodiment of the invention are made of materials having different stiffness to promote slight elastic deformation that facilitates mutual snap engagement and disengagement: the first upper piece 1a of the hollow body 1a, 1b can be formed for example into silicone rubber that is compatible with food use and the second lower piece 1b of the hollow body 1a, 1b can be formed into stiffer plastics compatible for food use.

The coffee dispenser 1 is associated with the housing 2 with removable engagement means.

The removable engagement means that associates the dispenser 1 with the housing 2 comprises at least one shape and force coupling, along the vertical axis V provided between the supply hole 21 of the end-piece 22 and the inlet hole 32 of the infused coffee in the dispenser 1.

The removable connection between the dispenser 1 and the housing 2 is secured by the shape and force coupling of the air venting channels 38 in the respective channels 23 of the housing 2.

Further, in order to maintain the correct position thereof, the dispenser 1 is provided with lower outer support feet 39 at a lower horizontal wall 40 of the housing 2 and with linear outside lateral coupling guides 41 with vertical grooves 42 obtained along internal vertical walls 43 of the housing 2. The guides 41 and grooves 42 allow for removably positioning the dispenser 1 within the housing 2 in the correct position.

The housing 2 more precisely comprises a first front assemblable and dismantlable piece 2a, and a second rear piece 2b supported by the machine body 100 in fixed mode or in slidable mode vertically for adjusting the distance of the dispenser 1 from the rest plane 105.

Snap-fitting means is further provided between the first piece 2a and the second piece 2b.

More precisely, the first piece 2a of the housing 2 comprises a frontal panel 49 equipped with a perimeter frame 47 that engages removably in a perimeter frame 48 of conjugate shape of the second piece 2b of the housing 2.

The second piece 2b of the housing 2 supports the end-piece 22 of the supply line 108 of the infused coffee, the engagement channels 23 for the air venting channels 38, and the vertical grooves 42 for the guides 41, whilst the lower wall of the frame 47 of the first piece 2a defines the rest wall 40 for the feet 39 of the dispenser 1.

In particular, the lower wall of the frame 47 of the first piece 2a has open transit slots 46 for the dispensing holes 33 that are the only parts of the dispenser 1 that protrude below outside the housing 2 when the first piece 2a of the housing 2 is fitted.

The snap-fitting means between the first piece 2a and the second piece 2b of the housing 2 is for example magnetic, but can also be mechanical.

In the illustrated case, the snap-fitting means between the first piece 2a and the second piece 2b of the housing 2 comprises for example permanent magnets 45 supported by the second piece 2b of the housing 2 and interacting with the magnetic or ferromagnetic material of which the first piece 2a of the housing 2 is formed.

The dispensing chamber 31 of the dispenser 1 is accessed in the following manner. First, the user dismantles with the fingers of the hands the first piece 2a of the housing 2 by exerting thereupon horizontal frontal traction that is sufficient to overcome the force of magnetic attraction between the two pieces 2a, 2b of the housing 2.

Once the first piece 2a of the housing 2 has been dismantled, a maneuvering space for removing the dispenser 1 is opened.

The dispenser 1 is removed by exerting thereupon with the fingers of the hands a vertical traction downwards of sufficient intensity to overcome the coupling force of the dispenser 1 to the end-piece 22 and to the channels 23.

Lastly, the first piece 1a of the dispenser 1 is dismantled by exerting thereupon with the fingers of the hands a compression force that is of sufficient intensity to release the tooth 35 from the snap-fit seat 36 and simultaneously a traction force in the direction of the engagement axis thereof with the second piece 1b of the dispenser 1.

At this point the dispenser 1 is dismantlable to be ready to be inspected and cleaned also internally by hand or in a dishwasher.

The dispenser as conceived herein is susceptible of numerous modifications and variants, all falling within the scope of the inventive concept; furthermore, all the details are replaceable by technically equivalent elements.

In practice, the materials used, as well as the dimensions, can be any according to the needs and the state of the art.

The invention claimed is:

1. A coffee machine comprising:
   a machine body,
   a housing supported by said machine body,
   a coffee infuser, and
   an infused coffee dispenser housed in said housing and in
      fluid connection with a single fluid line connecting said
      coffee infuser and said infused coffee dispenser, said
      infused coffee dispenser comprising:
      a hollow body delimiting at least one dispensing cham-
        ber dispensing infused coffee and having at least one
        inlet hole for the infused coffee and at least one
        dispensing hole for dispensing the infused coffee,
        wherein said at least one inlet hole is vertical,
      wherein said hollow body of said infused coffee dis-
        penser is formed into only two pieces comprising a
        first upper piece formed of a silicone material having
        a first stiffness and the first upper piece defining the
        coffee inlet hole and a second lower piece formed of
        a plastic material having a second stiffness higher
        than the first stiffness and the second lower piece
        defining the coffee outlet hole, wherein said first
        upper piece and said second lower piece are fittable
        and dismantlable by a snap-fitting means to close and
        open a direct access inside said dispensing chamber
        with one or more fingers of hands of a user,
      a storage chamber receiving the infused coffee from
        said at least one inlet hole and communicating with
        said at least one dispensing chamber, and a removable engagement means of said infused coffee dispenser being provided in said housing, said removeable engagement means comprising a shape and force coupling along a vertical axis, wherein said shape and force coupling is provided between said inlet hole and a vertical supply hole for supplying the infused coffee present inside said housing.

2. The coffee machine according to claim 1, wherein said housing is formed into several pieces comprising at least a first dismantlable piece adapted for opening a maneuvering space to engage and disengage said infused coffee dispenser from said housing.

3. The coffee machine according to claim 1, wherein said snap-fitting comprises at least one coupling tooth that is engageable in a corresponding snap-fit seat.

4. The coffee machine according to claim 1, said housing further comprising a first front piece and a second rear piece supported by said machine body, and a snap-fitting between said first front piece and second rear piece of said housing.

5. The coffee machine according to claim 4, wherein said snap-fitting of said first front piece and second rear piece of said housing is magnetic.

6. The coffee machine according to claim 1, wherein said hollow body comprises at least one vertical air venting channel above said body and comprising a shape and force coupling with a corresponding axially open vertical channel in said housing.

7. An access method for accessing a dispensing chamber of an infused coffee dispenser housed in a housing supported by a machine body of a coffee machine and in fluid connection with a single fluid line connecting a coffee infuser of the coffee machine and said infused coffee dispenser, wherein the method comprises the following steps performed in succession:

dismantling manually from said housing a fittable and dismantlable piece of said housing so as to open a maneuvering space for disengaging said infused coffee dispenser from said housing;

removing manually said infused coffee dispenser from said housing; and dismantling manually from said infused coffee dispenser a first upper piece of said infused coffee dispenser that is snap-fitted onto a second lower piece of said infused coffee dispenser, so as to access the inside of said dispensing chamber, wherein said first upper piece is formed of a silicone material having a first stiffness and said second lower piece is formed of a plastic material having a second stiffness higher than the first stiffness, the first upper piece defining a coffee inlet hole and the second lower piece defining a coffee outlet hole, wherein the infused coffee dispenser includes only the first upper part and the second lower part.

8. The access method for accessing the dispensing chamber of said infused coffee dispenser according to claim 7, wherein said infused coffee dispenser is removed from said housing by exerting thereupon a vertical downward traction force.

\*    \*    \*    \*    \*